J. N. PARKER.
TRACTOR.
APPLICATION FILED MAR. 26, 1918.
1,286,399.
Patented Dec. 3, 1918.
3 SHEETS—SHEET 3.
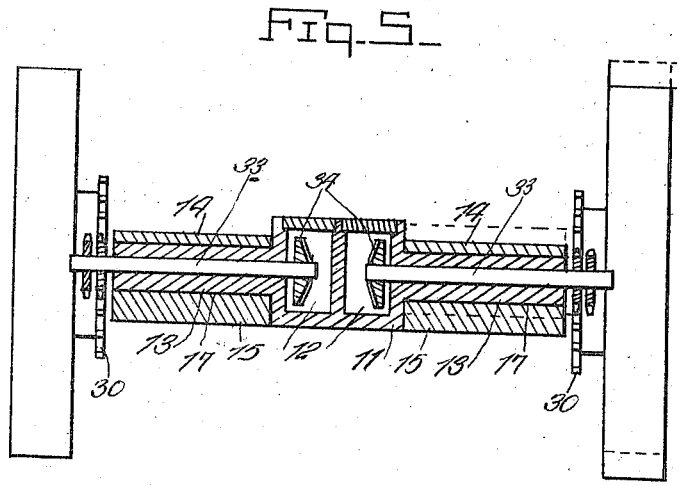
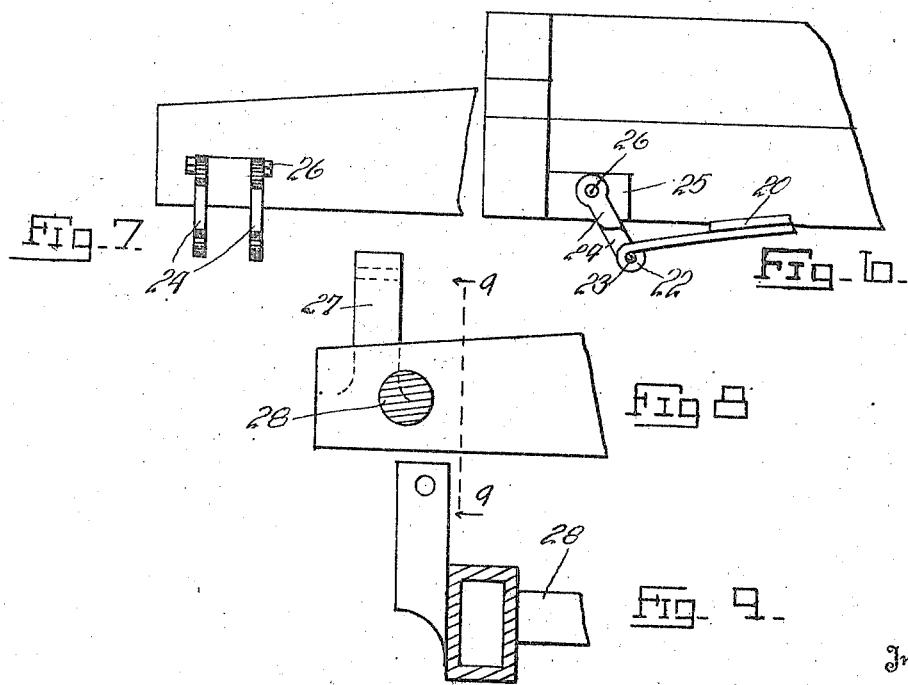

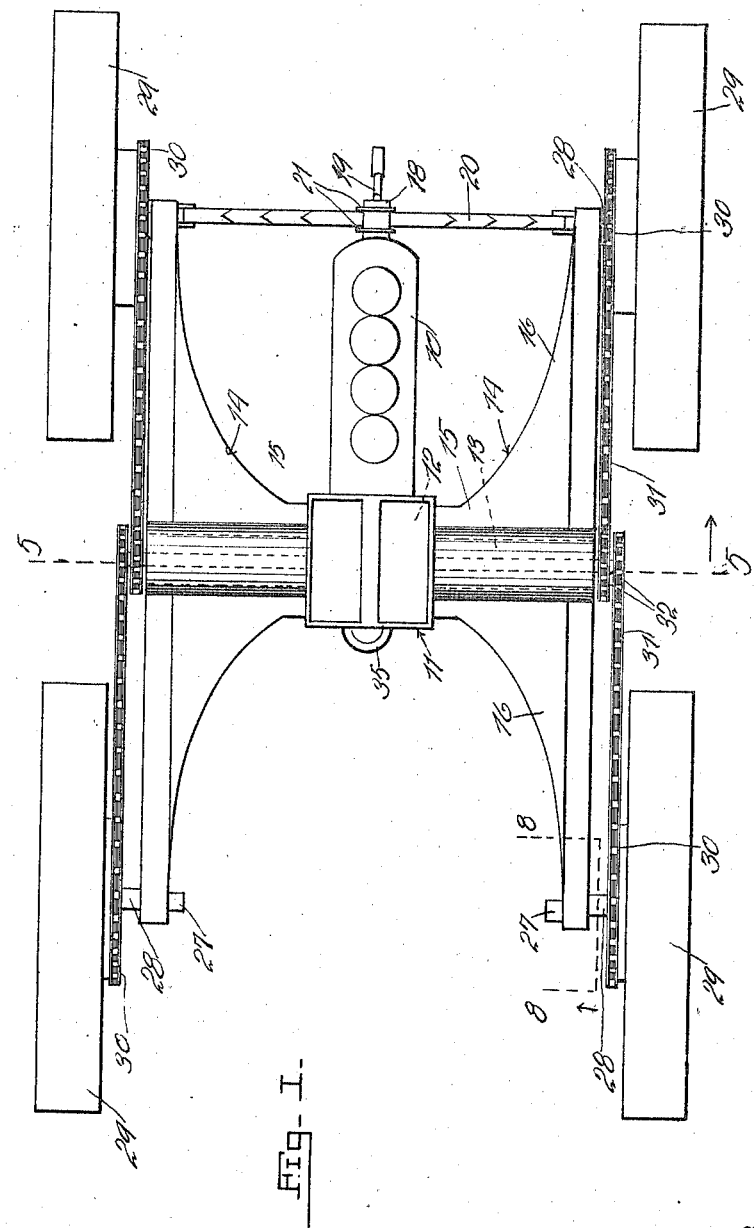

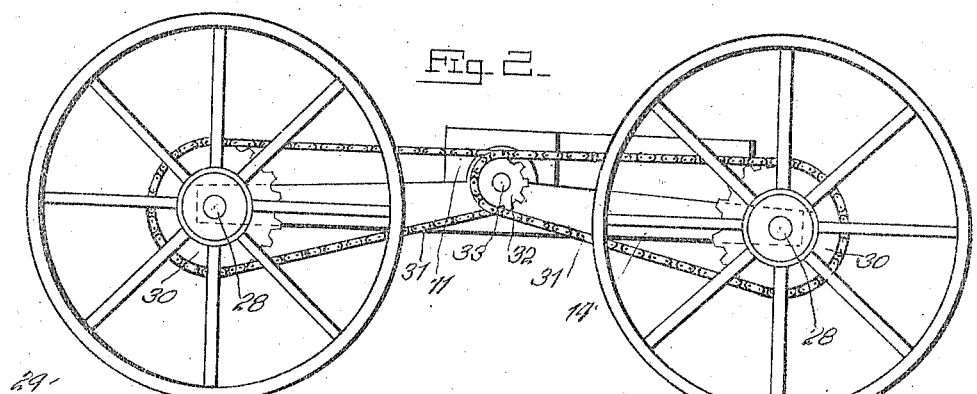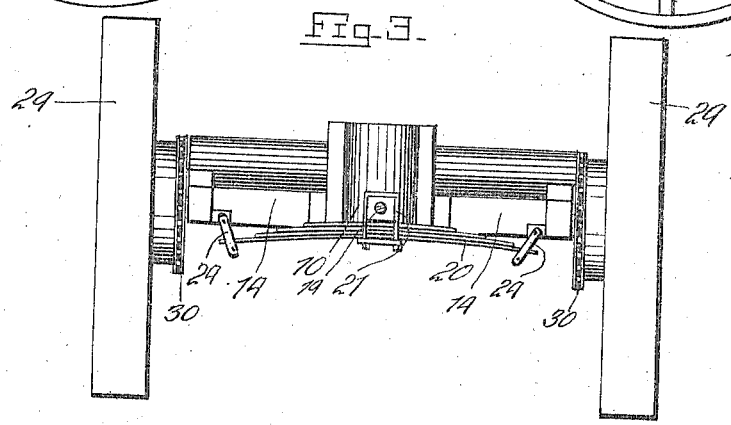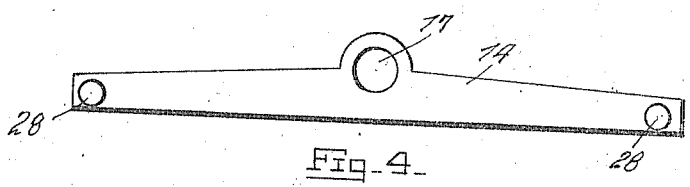

UNITED STATES PATENT OFFICE.

JOSEPH NICHOLAS PARKER, OF BEDFORD, VIRGINIA.

TRACTOR.

1,286,899.

Specification of Letters Patent.  Patented Dec. 3, 1918.

Application filed March 26, 1918. Serial No. 224,871.

*To all whom it may concern:*

Be it known that I, JOSEPH N. PARKER, a citizen of the United States, residing at Bedford, in the county of Bedford and State of Virginia, have invented certain new and useful Improvements in Tractors, of which the following is a specification.

My invention relates to improvements in tractors.

An important object of the invention is to provide a tractor, which is so constructed that the same is adapted to conform to the irregularities in the road-bed over which the same is traveling.

A further object of the invention is to provide a tractor of the above mentioned character, having oscillatory side frame-members, which carry traction wheels at the opposite ends thereof, together with means to independently drive, in unison, the wheels carried by each side frame-member, the side frame-members swinging about the drive shafts of the driving means.

A further object of the invention is to provide a tractor of the above mentioned character formed of few and simple parts.

A further object of the invention is to provide means whereby one side frame-member is pivotally connected with the body portion of the tractor, in an eccentric manner, and adapted to be swung to an inverted position, to assume a position above the coacting side frame-member, whereby the tractor is adapted to travel upon a hill-side.

Other objects and advantages of the invention will be apparent during the course of the following description.

In the accompanying drawings forming a part of this specification, and in which like numerals are employed to designate like parts throughout the same, Figure 1 is a plan view of a tractor embodying my invention, Fig. 2 is a side elevation of the same, Fig. 3 is a forward end elevation of the tractor, Fig. 4 is a side elevation of one side frame-member, Fig. 5 is a transverse sectional view taken on line 5—5 of Fig. 1, Fig. 6 is an enlarged side elevation of the connecting means between the front spring and corresponding side frame-member, Fig. 7 is an elevation of the same, taken at a right angle to Fig. 6, Fig. 8 is a longitudinal sectional view taken on line 8—8 of Fig. 1, and, Fig. 9 is a transverse sectional view taken on line 9—9 of Fig. 8.

In the drawings, wherein for the purpose of illustration is shown a preferred embodiment of my invention, the numeral 10 designates an internal combustion engine of any well known or preferred type. Rigidly secured to the rear end of the engine 10 is a gear case 11, having compartments 12, as shown more clearly in Fig. 5. The engine 10 and gear case 11 constitute the spine or body portion of the tractor.

As more clearly shown in Figs. 1 and 5, the numeral 13 designates tubular trunnions or shafts, preferably formed integral with the gear case 11. The tubular trunnions 13 extend transversely of the tractor and are arranged at a right angle to the gear case 11, as shown.

Arranged upon opposite sides of the gear case 11 are side frame-members 14, including a transverse portion 15, carrying longitudinal arms 16, which taper toward the free ends thereof, as shown. The side frame-members 14 are preferably made of hollow castings, whereby the same are sufficiently strong and light, while the invention is in no sense restricted to this precise construction. The transverse portions 15 of the frame-members 14 have transverse cylindrical openings 17 formed therein, pivotally receiving trunnions 13. Any suitable means may be employed to prevent the longitudinal displacement of the frame-members 14 upon the trunnions 13.

At its forward end the engine 10 is provided with a block or casting 18, preferably formed integral therewith. This block or casting has an opening for the extension of the crank-shaft 19, as shown. Disposed beneath the casting 18 is a transverse leaf spring 20, which is clamped or bound to the casting 18 by U-bolts 21, as shown. At each end, as more clearly shown in Figs. 6 and 7, the leaf spring 18 has one leaf bent to provide an eye 22, surrounding a bolt 23. The eye 22 is arranged within a pair of spaced links 24, apertured for the passage of the bolt 23. The links 24 are disposed upon opposite sides of a block 25, and pivoted thereto by means of a bolt 26. The block 25 is preferably cast integral with the side frame-member. It is thus apparent that the forward end of the engine 10 is connected with the forward ends of the frame-members 14 through the medium of the spring 20 and associated elements and is adapted to be yieldingly supported thereby. This yielding connection is such that it permits of the swinging movements of the frame-members 14, upon the trunnions 13 with respect to the engine 10.

As more clearly shown in Fig. 4, the opening 17 formed in the frame-member 14 is eccentric with respect thereto, and above the longitudinal axis thereof. It is thus seen that the frame-members are normally pivoted to the gear case 11 beneath the central longitudinal axis of the gear case. When one frame-member 14 is turned for one-half of a revolution so that it is inverted, it is obvious that the same will be shifted to an elevated position with respect to the other frame-member 14, whereby the corresponding traction wheels (to be described) will be elevated above the other traction wheels (to be described) and the tractor particularly well adapted to travel upon a hill-side. In order that the frame-member 14 may be thus inverted, the bolt 26 is removed whereby the links 24 are disconnected from the casting 25. The frame-member is then inverted, for instance by swinging the same to the right in Fig. 1. At the rear end of the frame-member is an attaching member or casting 27, preferably formed integral therewith. This attaching member, when the frame-member is in the normal position as shown in Fig. 1, projects upwardly as shown in Figs. 8 and 9, but when the frame-member is inverted it extends downwardly, to occupy a position corresponding to the block 25, in Fig. 10. The links 24 are disposed upon opposite sides of the attaching member 27 and the bolt 26 employed to connect the forward end of the spring 20 with the attaching member 27. I prefer to equip each frame-member 14 with an attaching member 27, so that each frame-member may be inverted, as desired.

Rigidly secured to the opposite ends of the frame-members 14 are axles 28, pivotally receiving thereon, traction wheels 29, of any well known or preferred construction. These traction wheels have connection with sprocket wheels 30, which drive the same. The sprocket wheels 30 are engaged and driven by sprocket chains, 31, extending inwardly to engage with smaller sprocket wheels 32, which are rigidly attached to drive shafts 33. The drive shafts 33 are independently rotatable and are equipped at their inner ends with bevel gears 34, rigidly secured thereto. These bevel gears are disposed within the compartments 12 and are adapted to be operated by separate speed-changing and reverse transmission gearing (not shown) of any well known or preferred type. This gearing is of course driven by or from the engine 10. It is thus apparent that each pair of traction wheels carried by each frame-member is driven by one drive shaft 33 and the traction wheels in each pair are thereby driven in unison.

The draw-bar (not shown) is preferably connected with an attaching element 35, rigidly secured to the rear end or the gear case 11.

The operation of the tractor is as follows:

The transmission gearings (not shown) operating within the compartments 12 may be adjusted to drive the bevel gears 34 and their shafts 33 in the same direction and at the same speed, whereby the traction wheels 29 will be rotated and the tractor caused to travel forwardly in a straight path. The steering of the tractor is effected by adjusting one transmission gearing so that it operates to drive the corresponding shaft 33 slower than the other shaft 33, thereby causing the tractor to travel laterally or turn around. I also contemplate adjusting the transmission gearing to cause the same to operate in reverse, thereby causing one set of traction wheels to travel in opposite directions with respect to the other, which would effect a quicker turning around of the tractor. It is obvious that the tractors may be caused to move rearwardly, by adjusting each set of transmission gearing to reverse.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A tractor of the character described, comprising an engine and a gear case which constitute the body portion of the tractor, tubular trunnions secured to the opposite sides of the gear case, side frame-members pivotally mounted upon the tubular trunnions, at points disposed between the ends of the side frame-member, a pair of traction wheels connected with the opposite end portions of each side frame-member, a pair of drive shafts rotatable within the tubular trunnions, gearing for positively connecting each pair of traction wheels with the corresponding drive shaft, separate means to rotate each drive shaft, and self adjusting means connecting corresponding ends of the side frame-members with the forward end of the engine.

2. A tractor of the character described, comprising a longitudinally extending engine, a gear casing rigidly secured to the rear end of the engine, tubular trunnions arranged upon opposite sides of the gear casing and rigidly secured thereto and extending transversely thereof, side frame-members pivotally mounted between their ends upon the tubular trunnions, a pair of traction wheels connected with the opposite ends of each side frame-member, a pair of drive shafts rotatable within the tubular trunnions, driving connecting means between the outer end of each drive shaft and the corresponding pair of traction wheels and adapted to drive the traction wheels in each pair in unison, and separate means to rotate the drive shafts.

3. A tractor of the character described, comprising a body portion, tubular trunnions connected with the body portion and extending transversely upon the opposite sides thereof, side frame-members provided between their ends with transverse openings to pivotally receive the tubular trunnions, drive shafts arranged within the tubular trunnions, a pair of traction wheels connected with the end portions of each side frame-member, driving connecting means between each drive shaft and the corresponding pair of traction wheels, and a spring connected with one end of the body portion and having connection with corresponding ends of the side frame-members.

4. A tractor of the character described, comprising a body portion, trunnions connected with the body portion and extending transversely upon the opposite sides thereof, side frame-members pivotally mounted upon the trunnions, traction wheels connected with the end portions of the side frame-members, means connected with the body portion to drive the traction wheels, and a transverse spring connected with one end portion of the body portion and connected with corresponding end portions of the side frame-members.

5. A tractor of the character described, comprising a body portion provided upon its opposite sides with trunnions, side frame-members provided between their ends with openings which are disposed eccentric with relation to the longitudinal axes of the frame-members and adapted for pivotally receiving said trunnions, whereby the frame-members are adapted to be swung to inverted positions in an elevated plane, traction wheels carried by the end portions of the side frame-members, and means to drive the traction wheels.

6. A tractor of the character described, comprising a body portion provided upon its opposite sides with trunnions, side frame-members provided between their ends with openings with the opening in one frame-member being disposed eccentric with respect to the longitudinal axis thereof whereby such frame-member is adapted to be swung to an inverted position in an elevated plane, traction wheels carried by the end portions of the side frame-members, and means to drive the traction wheels.

7. A tractor of the character described, comprising a body portion provided upon its opposite sides with trunnions, side frame-members provided between their ends with openings with the opening in one frame-member being disposed eccentric with respect to the longitudinal axis thereof, said openings being adapted for the reception of the trunnions, traction wheels carried by the end portions of the side frame-members, a spring having one end thereof connected with one end of one side frame-member, means for alternately connecting the opposite end of the spring with the opposite ends of the other side frame-member, and means to drive the traction wheels.

In testimony whereof I affix my signature in presence of two witnesses.

JOSEPH NICHOLAS PARKER.

Witnesses:
FRANK S. WING,
J. C. PARKER.

Copies of this patent may be obtained for five cents each, by addressing the "Commissioner of Patents, Washington, D. C."